United States Patent
Umayahara et al.

(10) Patent No.: US 9,758,169 B2
(45) Date of Patent: Sep. 12, 2017

(54) VEHICLE EMPLOYING ORDINARY AND DECELERATION ENHANCED DRIVE MODES IN AN ACCELERATOR-OFF STATE

(71) Applicant: TOYOTA JIDOSHA KABUSHIKI KAISHA, Toyota-shi, Aichi-ken (JP)

(72) Inventors: Kenji Umayahara, Miyoshi (JP); Mitsuhiro Nada, Toyota (JP); Takuya Nakagami, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/936,527

(22) Filed: Nov. 9, 2015

(65) Prior Publication Data
US 2016/0129809 A1    May 12, 2016

(30) Foreign Application Priority Data
Nov. 12, 2014  (JP) .................. 2014-229942

(51) Int. Cl.
*B60L 7/26*     (2006.01)
*B60W 20/00*    (2016.01)
(Continued)

(52) U.S. Cl.
CPC ......... *B60W 30/18127* (2013.01); *B60L 7/26* (2013.01); *B60L 11/1881* (2013.01);
(Continued)

(58) Field of Classification Search
CPC .... B60L 7/20; B60L 15/2009; B60L 11/1881; B60L 7/10; B60L 7/12; B60L 7/14;
(Continued)

(56) References Cited

U.S. PATENT DOCUMENTS 2,747,139 A * 5/1956 Foland ................. B60Q 1/1423
                                                    315/136
3,780,597 A * 12/1973 White ..................... F16H 59/12
                                                    74/10.33
(Continued)

FOREIGN PATENT DOCUMENTS

DE   10 2010 004 846 A1    3/2011
JP      H08-79907 A        3/1996
(Continued)

OTHER PUBLICATIONS

JPO machine translation of JP 10-304508 (original JP document published Nov. 13, 1998).*

(Continued)

*Primary Examiner* — Behrang Badii
*Assistant Examiner* — David Testardi
(74) *Attorney, Agent, or Firm* — Finnegan, Henderson, Farabow, Garrett & Dunner, LLP (57) ABSTRACT

A vehicle comprises a fuel cell that is configured to receive supply of a fuel gas and generate electric power and a motor that is configured to be driven with the electric power generated by the fuel cell. The vehicle selectively sets a drive mode of the vehicle in an accelerator-off state between an ordinary mode and a deceleration enhanced mode that decelerates the vehicle with higher deceleration force than deceleration force in the ordinary mode. The vehicle performs regenerative control of the motor in the ordinary mode or performs deceleration control of generating the deceleration force in the deceleration enhanced mode, in order to decelerate the vehicle in the set drive mode. When an accelerator stroke based on a driver's depression of an accelerator becomes higher than a cancellation threshold in the drive mode set to the deceleration enhanced mode, the (Continued)

vehicle changes the drive mode from the deceleration enhanced mode to the ordinary mode.

8 Claims, 5 Drawing Sheets

(51) Int. Cl.
    *B60W 30/18*     (2012.01)
    *B60L 15/20*     (2006.01)
    *B60L 11/18*     (2006.01)

(52) U.S. Cl.
    CPC ...... B60L 15/2009 (2013.01); *B60W 2540/10* (2013.01); *B60W 2540/103* (2013.01); *Y02T 10/7005* (2013.01); *Y02T 10/7275* (2013.01)

(58) Field of Classification Search
    CPC ...... B60L 7/16; B60L 7/18; B60L 7/22; B60L 7/24; B60L 7/26; B60W 30/18127; B60W 2540/10; B60W 2540/103
    See application file for complete search history.

(56) References Cited

U.S. PATENT DOCUMENTS

| | | | | |
|---|---|---|---|---|
| 4,219,121 A * | 8/1980 | McPeak | ............... | B66C 23/88 212/281 |
| 4,817,471 A * | 4/1989 | Tury | ............... | F16H 59/12 477/121 |
| 4,884,057 A * | 11/1989 | Leorat | ............... | B60K 20/06 180/333 |
| 5,412,251 A * | 5/1995 | Furutani | ............... | B60K 6/46 180/69.5 |
| 5,476,310 A * | 12/1995 | Ohtsu | ............... | B60L 3/108 180/165 |
| 5,490,721 A * | 2/1996 | Bartell | ............... | B60T 8/4022 303/10 |
| 5,755,200 A * | 5/1998 | Henderson | ............... | F02D 9/02 123/367 |
| 5,915,801 A * | 6/1999 | Taga | ............... | B60K 6/48 303/152 |
| 6,378,636 B1 * | 4/2002 | Worrel | ............... | B60L 15/20 180/65.25 |
| 6,487,484 B1 * | 11/2002 | Shober | ............... | F16H 59/12 477/125 |
| 7,530,923 B2 * | 5/2009 | Saito | ............... | F16H 61/0213 477/115 |
| 7,628,236 B1 * | 12/2009 | Brown | ............... | B60K 6/26 180/65.21 |
| 8,718,852 B2 * | 5/2014 | Weng | ............... | B60K 1/00 180/65.265 |
| 2002/0007241 A1 * | 1/2002 | Kupper | ............... | F16D 48/068 701/51 |
| 2002/0067071 A1 * | 6/2002 | Kusano | ............... | B60T 7/042 303/113.4 |
| 2002/0147070 A1 * | 10/2002 | Izumiura | ............... | B60K 6/485 477/4 |
| 2003/0207156 A1 * | 11/2003 | Ovshinsky | ............... | H01M 10/613 429/9 |
| 2004/0159480 A1 * | 8/2004 | Ishikawa | ............... | B60L 7/26 429/430 |
| 2008/0017427 A1 * | 1/2008 | Nakanowatari | ............... | B60K 6/365 180/65.235 |
| 2008/0084286 A1 * | 4/2008 | Teramura | ............... | B60Q 1/085 340/438 |
| 2009/0298641 A1 * | 12/2009 | Boot | ............... | B60W 10/06 477/4 |
| 2010/0179025 A1 | 7/2010 | Hyakutake | | |
| 2010/0235043 A1 * | 9/2010 | Seta | ............... | B60L 3/0038 701/29.2 |
| 2012/0022735 A1 * | 1/2012 | Tashiro | ............... | B60L 7/18 701/22 |
| 2012/0325042 A1 * | 12/2012 | Takiguchi | ............... | B60W 10/06 74/513 |
| 2013/0162009 A1 * | 6/2013 | Mitts | ............... | B60L 3/102 303/3 |
| 2013/0184923 A1 * | 7/2013 | Sawayama | ............... | B60L 11/14 701/22 |
| 2015/0006039 A1 * | 1/2015 | Hyun | ............... | B60W 10/192 701/48 |
| 2015/0222209 A1 * | 8/2015 | Crisp | ............... | H02P 3/14 318/376 |
| 2016/0144850 A1 * | 5/2016 | Debert | ............... | B60K 6/48 701/22 |

FOREIGN PATENT DOCUMENTS

| | | | |
|---|---|---|---|
| JP | 10304508 A | * | 11/1998 |
| JP | 2000270405 A | * | 9/2000 |
| JP | 2002337573 A | * | 11/2002 |
| JP | 2007-123169 | | 5/2007 |
| JP | 2010-159853 | | 7/2010 |
| JP | 2010183654 A | * | 8/2010 |
| JP | 2010-223250 | | 10/2010 |
| JP | 2010279186 A | * | 12/2010 |
| JP | 2014-135814 A | | 7/2014 |

OTHER PUBLICATIONS

Certified EP application 14153458.6 (original EP application filed Jan. 31, 2014).*

* cited by examiner

VEHICLE EMPLOYING ORDINARY AND DECELERATION ENHANCED DRIVE MODES IN AN ACCELERATOR-OFF STATE

CROSS-REFERENCE TO RELATED APPLICATIONS

The present application claims priority from Japanese patent application P2014-229942 filed on Nov. 12, 2014, the content of which is hereby incorporated by reference into this application.

BACKGROUND

Field

The present invention relates to a vehicle.

Related Art

A fuel cell is mounted, along with a motor, on a vehicle to generate electric power with supply of a fuel gas and supply the generated electric power to the motor linked with an axle of the vehicle. The motor is driven with the electric power generated by the fuel cell, while regenerating electric power under regenerative control to brake the axle. The vehicle is decelerated with the braking force generated by the regenerative control of the motor during a run according to the requirement. Braking by regenerative control is applied mainly in the following two situations:

1) when the driver steps on a brake pedal for the purpose of braking the vehicle;

In this case, the intensity of regenerative braking is controlled to be proportional to the driver's depression amount of the brake pedal.

2) when the driver changes a shift lever to braking position provided in a shift device.

In this case, like engine braking in a conventional engine vehicle, a specific braking force by regenerative control is applied to the axle (driveshaft) irrespective of the driver's operation of the brake pedal. In this state, when the driver steps on the brake pedal, in addition to this braking force applied to the axle, a braking force corresponding to the driver's depression amount of the brake pedal is applied to the axle. Accordingly, this enables the driver to brake the vehicle with the higher deceleration force than the deceleration force during an ordinary run. The braking force corresponding to the driver's depression amount of the brake pedal is increased with an increase in initial regeneration level. In the case where the braking force only by regenerative braking is insufficient, a hydraulic brake or the like may be used to generate a higher deceleration force and decelerate the vehicle with the higher deceleration force. Such deceleration control technique is described in, for example, JP 2007-123169A.

This proposed deceleration control technique controls the braking force of the vehicle by adding a specific braking force to the ordinary braking force, when the driver changes the shift lever to the braking position. This deceleration control technique, however, requires the driver to return the shift lever to the drive position, in order to change the drive mode from an additional deceleration drive mode with the additional braking force to an ordinary deceleration drive mode that decelerates the vehicle with the ordinary braking force. Unlike the conventional engine vehicle, in a vehicle using a motor, such as a fuel cell vehicle, the gear ratio is not changed by the driver's operation of the shift lever. Changing the shift lever to the braking position accordingly does not change the magnitude of drive torque corresponding to the depression amount of the accelerator. Providing the braking position in a shift device and requiring the driver to operate the shift device may thus provide a feeling of strangeness. There is accordingly a need to relieve the driver's load to change the drive mode between an additional deceleration drive mode with additional braking force and an ordinary deceleration drive mode that decelerates the vehicle with only the ordinary braking force and without additional braking force.

SUMMARY

In order to solve at least part of the above problems, the invention may be implemented by any of the following aspects.

(1) According to one aspect of the invention, there is provided a vehicle. The vehicle may comprise a fuel cell that is configured to receive supply of a fuel gas and generate electric power; a motor that is configured to be driven with the electric power generated by the fuel cell; a mode selector that is configured to selectively set a drive mode of the vehicle in an accelerator-off state between an ordinary mode and a deceleration enhanced mode that decelerates the vehicle with higher deceleration force than deceleration force in the ordinary mode; and a controller that is configured to perform regenerative control of the motor in the ordinary mode or perform deceleration control of generating the deceleration force in the deceleration enhanced mode, in order to decelerate the vehicle in the drive mode set by the mode selector. When an accelerator stroke based on a driver's depression of an accelerator becomes higher than a cancellation threshold in the drive mode set to the deceleration enhanced mode, the controller may change the drive mode from the deceleration enhanced mode to the ordinary mode.

When the accelerator stroke becomes higher than the cancellation threshold in the drive mode set to the deceleration enhanced mode, the vehicle of the above aspect changes the drive mode from the deceleration enhanced mode that provides deceleration with the higher deceleration force than that in the ordinary mode to the ordinary mode. The driver's depression of the accelerator is not based on the driver's intention of changing the drive mode from the deceleration enhanced mode to the ordinary mode but is based on the driver's intention of acceleration. The vehicle of this aspect accordingly does not require the driver's any specific operation to return the drive mode from the deceleration enhanced mode to the ordinary mode. This relieves the driver's load. In the vehicle of this aspect, the increase of the accelerator stroke to change the drive mode from the deceleration enhanced mode to the ordinary mode is attributed to the driver's depression of the accelerator based on the driver's intention of acceleration. The deceleration force in the case of the driver's release of the accelerator after depression of the accelerator is reduced by changing the drive mode to the ordinary mode. This does not provide significant deceleration of the vehicle, in the case of the driver's release of the accelerator after significant depression of the accelerator based on the driver's intention of acceleration. The vehicle of this aspect thus reduces the likelihood that the driver feels strange.

(2) In the vehicle of the above aspect, the mode selector may change the set drive mode from the ordinary mode to the deceleration enhanced mode, in response to the driver's specified operation. This enables the driver's intention to be clearly reflected in the case of changing the drive mode to the deceleration enhanced mode that provides deceleration with the high deceleration force. In the case of changing the drive mode from the deceleration enhanced mode to the ordinary mode, this configuration does not require the driver's any specific operation and thereby relieves the driver's load as described above.

(3) In the vehicle of the above aspect, the cancellation threshold may take different values when a vehicle speed is in a low speed range and in a high speed range, and the cancellation threshold in the low speed range may be higher than the cancellation threshold in the high speed range. This configuration has the following advantages. The driver steps on the accelerator for the purpose of acceleration, whether the vehicle speed is in the low speed range or in the high speed range. In the low speed range, the vehicle of this aspect does not return the drive mode from the deceleration enhanced mode to the ordinary mode but maintains the deceleration enhanced mode unless significant depression of the accelerator is provided. The vehicle generally repeats deceleration and acceleration in a traffic jam and is likely to run in the low speed range. During a run of the vehicle in the low speed range with repetition of deceleration and acceleration in a traffic jam, the vehicle reduces the frequency of returning the drive mode from the deceleration enhanced mode to the ordinary mode. Accordingly, the vehicle of this aspect performs deceleration control with the higher deceleration force in the deceleration enhanced mode, based on the driver's repetitive demands for deceleration and acceleration.

(4) In the vehicle of the above aspect, the controller may generate the deceleration force in the deceleration enhanced mode by combination of the regenerative control of the motor and drive control of a braking device that is configured to mechanically brake rotations of wheels. This facilitates generation of the high deceleration force in the deceleration enhanced mode.

The invention may be implemented by any of various aspects other than the vehicle of the above aspects, for example, a drive control apparatus and a drive control method of a vehicle equipped with a fuel cell and a moving body equipped with a fuel cell system.

DESCRIPTION OF THE EMBODIMENTS

Figure 1:
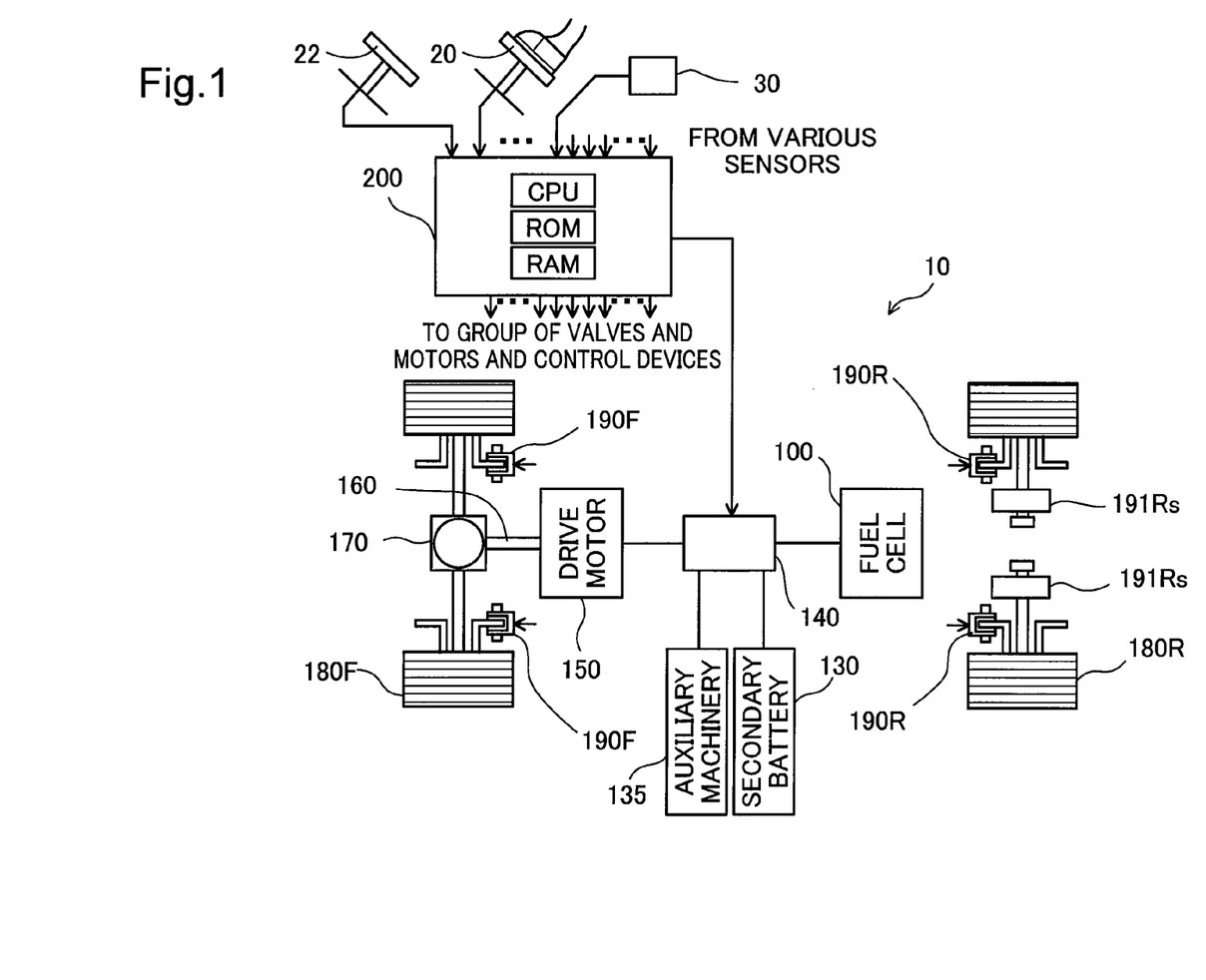
FIG. 1 is a diagram schematically illustrating the configuration of a vehicle according to an embodiment of the invention.

The following describes an embodiment of the invention with reference to the accompanied drawings. FIG. 1 is a diagram schematically illustrating the configuration of a vehicle 10 according to an embodiment of the invention. The vehicle 10 includes a fuel cell 100, a controller 200, a secondary battery 130, auxiliary machinery 135, a distribution controller 140, a drive motor 150, a driveshaft 160, a distribution gear 170, front wheels 180F, rear wheels 180R, front wheel brakes 190F and rear wheel brakes 190R. The vehicle 10 of the embodiment is a front-wheel drive vehicle, so that the driving force of the drive motor 150 is transmitted from the driveshaft 160 to the front wheels 180F and is more specifically distributed by the distribution gear 170 into the left and right front wheels 180F. The front wheel brakes 190F and the rear wheel brakes 190R are respectively provided on the front wheels 180F and the rear wheels 180R as hydraulically-actuated disk brakes and are controlled by the controller 200 to decelerate the vehicle 10. The left and right rear wheels 180R are driven wheels that are independently suspended by suspensions 191Rs and are accordingly do not have a driveshaft 160. The left and right front wheels 180F are also suspended by suspensions, although not being specifically illustrated.

The fuel cell 100 is configured to receive supplies of a fuel gas and an oxidizing gas and generate electricity through electrochemical reaction of the fuel with oxygen. The controller 200 calculates supply amounts of the respective gases to the fuel cell 100 in response to an output request corresponding to the driver's depression amount of an accelerator 20, and controls the operations of the fuel cell 100 and the secondary battery 130 based on this output request. The vehicle 10 includes a fuel gas supply system and a fuel gas discharge system that are involved in supply and discharge of the fuel gas to and from the fuel cell 100, an oxidizing gas supply system and an oxidizing gas discharge system that are involved in supply and discharge of the oxidizing gas to and from the fuel cell 100, and a cooling water circulation system that is configured to cool down the fuel cell 100. These systems are, however, not directly involved in the scope of the invention and are not specifically described herein. For example, a compressor included in the oxidizing gas supply system and a circulation pump included in the cooling water circulation system belong to the auxiliary machinery 135 and are driven under control of the controller 200.

The secondary battery 130 may be, for example, a nickel hydride battery or a lithium ion battery and is configured to output electric power stored in the secondary battery 130 as driving power for driving the drive motor 150 and the auxiliary machinery 135 via the distribution controller 140. The secondary battery 130 may be directly charged with electric power generated by the fuel cell 100 and may also be charged with regenerative electric power obtained by regeneration of the kinetic energy of the vehicle 10 by the drive motor 150 during deceleration of the vehicle 10, for example, when the driver steps on a brake pedal 22. The distribution controller 140 controls distribution of the amount of electric power to be output from the fuel cell 100 to the drive motor 150, the amount of electric power to be output from the secondary battery 130 to the drive motor 150 and the amount of driving power to be output to each of the auxiliary machinery 35. During deceleration of the vehicle 10, the distribution controller 140 charges the secondary battery 130 with regenerative electric power by the drive motor 150. Regeneration of electric power by the drive motor 150 and the distribution of electric power and battery charging by the distribution controller 140 are under control of the controller 200. The distribution controller 140 includes, in addition to a DC-DC converter (not shown), a voltage step-down unit that is configured to adjust the voltage to be adequate for each of the drive motor 150 and the auxiliary machinery 135, and distributes the electric power of the adjusted voltage into each of the drive motor 150 and the auxiliary machinery 135.

The drive motor 150 is driven with electric power generated by the fuel cell 100 and received via the distribution controller 140 and serves as a motor to drive the vehicle 10. During deceleration of the vehicle 10, the drive motor 150 serves as a generator to regenerate electrical energy from the kinetic energy of the vehicle 10 under control of the controller 200. The driveshaft 160 is a rotating shaft configured to transmit the driving force generated by the drive motor 150 to the distribution gear 170. The distribution gear 170 distributes the driving force into the left and right front wheels 180F.

The controller 200 is implemented by a microcomputer including a CPU that performs logical operations, a ROM and a RAM. The controller 200 receives inputs from, for example, an accelerator position sensor that is configured to detect the depression amount of the accelerator 20, a brake sensor that is configured to detect the depression amount of the brake pedal 22, a vehicle speed sensor (not shown) and a deceleration drive mode change switch 30, and performs various controls of the vehicle 10 including drive control of an injector (not shown) involved in gas supply and discharge, drive control of various valves provided to control supply and discharge of the fuel gas and the like, regenerative control of the drive motor 150 and drive control of the front wheel brakes 190F and rear wheel brakes 190R. According to this embodiment, the deceleration drive mode change switch 30 is provided as a push button-type switch placed on an instrument panel or a driving wheel of the vehicle 10. The deceleration drive mode change switch 30 is configured to be manually set and reset by the driver's operation and also to be automatically reset by the controller 200 as described later. This deceleration drive mode change switch 30 may be provided in a shift device. In this case, like the push button described above, the shift device is configured to automatically return the shift position to the drive position by means of solenoid or the like after the driver's operation of a shift lever from the drive position to the braking position.

Figure 2:
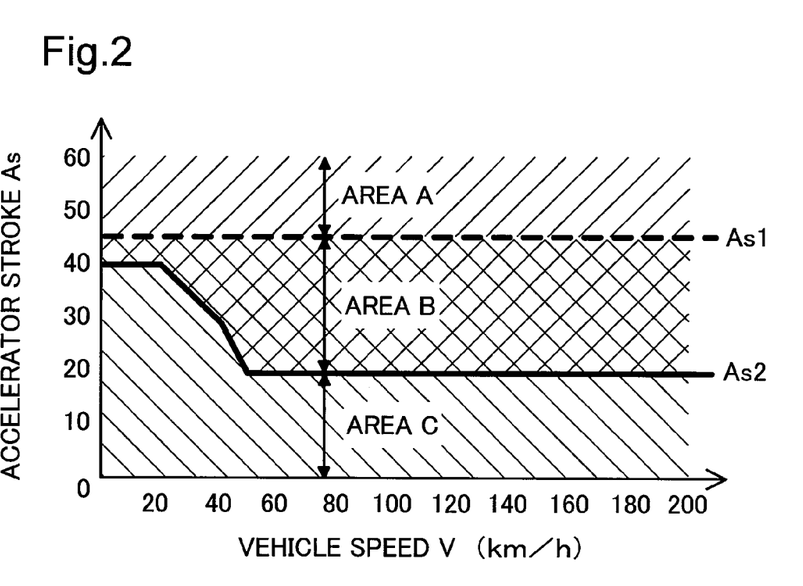
FIG. 2 is a diagram illustrating the concept of setting a deceleration drive mode with regard to a relationship between vehicle speed and stroke of an accelerator.

The following describes deceleration drive mode change control performed in the vehicle 10 of the embodiment. The vehicle 10 of the embodiment is allowed to drive in either of two deceleration drive modes in response to the driver's operation of the deceleration drive mode change switch 30. A first deceleration drive mode (hereinafter referred to as ordinary mode) is a deceleration drive mode employed during a run of the vehicle 10 without the driver's operation of the deceleration drive mode change switch 30. In the ordinary mode, the deceleration force required to decelerate the vehicle 10 in response to the driver's depression of the brake pedal 22 (shown in FIG. 1) is covered by the regenerative braking force obtained by regenerative control of the drive motor 150 by the controller 200. A second deceleration drive mode (hereinafter referred to as deceleration enhanced mode) is a deceleration drive mode performed upon satisfaction of a predetermined condition described later after the driver's operation of the deceleration drive mode change switch 30. In the deceleration enhanced mode, a specified braking force is applied to the driveshaft 160 when the driver releases the accelerator 20. The specified braking force corresponds to the braking force of engine braking in an engine vehicle. This braking is applied in the released state of the accelerator 20 and is thus called braking in the accelerator-off state or vehicle deceleration in the accelerator-off state. The deceleration force in the accelerator-off state is obtained by the regenerative control of the drive motor 150 by the controller 200. When the driver steps on the brake pedal 22 in this state, the braking force by regenerative control is increased. in response to an increase in depression amount of the brake pedal 22, the front wheel brakes 190F and the rear wheel brakes 190B are actuated and controlled to decelerate the vehicle 10 with the higher braking three than the braking force in the ordinary mode. After a change of the deceleration drive mode to the deceleration enhanced mode by the driver's operation of the deceleration drive mode change switch 30, the deceleration drive mode is returned from the deceleration enhanced mode to the ordinary mode upon satisfaction of a predefined condition described later. The deceleration drive mode switch 30 is reset to OFF upon satisfaction of a specified condition. FIG. 2 is a diagram illustrating the concept of setting the deceleration drive mode with regard to the relationship between the vehicle speed and the stroke of the accelerator 20.

As shown in FIG. 2, in the vehicle 10 of the embodiment, a first threshold As1 and a second threshold As2 are defined by the relationship between the vehicle speed and the stroke of the accelerator 20. The first threshold As1 is set to a constant accelerator stroke, irrespective of the vehicle speed. The second threshold As2 is set to different profiles in a low speed range having the vehicle speed of not higher than 50 km/h and in a high speed range having the vehicle speed of higher than 50 km/h. The second threshold As2 in the low speed range is set to be higher than the value of the second threshold As2 in the high speed range and to increase with a decrease in vehicle speed. The controller 200 changes the deceleration drive mode as described below, based on the threshold values As1 and As2 and an actual accelerator stroke As during a run.

During a run of the vehicle 10 at the time of and after the driver's operation of the deceleration drive mode change switch 30, the controller 200 activates the deceleration enhanced mode in response to the driver's release of the accelerator 20 in the state that the accelerator stroke As based on the driver's depression of the accelerator 20 is in an area C of lower than the second threshold As2. When the accelerator stroke As based on the driver's depression of the accelerator 20 is in an area A of not lower than the first threshold As1, the controller 200 does not accept the driver's ON operation of the deceleration drive mode change switch 30 but performs braking force control in the ordinary mode. When the accelerator stroke As based on the driver's depression of the accelerator 20 is in an area B of not lower than the second threshold As2 and lower than the first threshold As1 after the driver's operation of the deceleration drive mode change switch 30, the controller 200 suspends braking force control in the deceleration enhanced mode despite the driver's operation of the deceleration drive mode change switch 30. Suspending braking force control in the deceleration enhanced mode includes the following series of processing. When the accelerator stroke As increases from the area C to the area B after the driver's operation of the deceleration drive mode change switch 30, the controller 200 returns the deceleration drive mode from the deceleration enhanced mode to the ordinary mode. In this state, the controller 200 does not cancel the deceleration enhanced mode but suspends the deceleration enhanced mode. When the accelerator stroke As decreases from the area B to the area C during the braking force control in the ordinary mode, the controller 200 returns the deceleration drive mode to the deceleration enhanced mode and performs braking force control in the deceleration enhanced mode. When the accelerator stroke As further increases from the area B to the area A after the driver's operation of the deceleration drive mode change switch 30, on the other hand, the controller cancels the suspending deceleration enhanced mode and resets the setting of the deceleration drive mode change switch 30.

Even when the accelerator stroke As decreases to the area C, the controller 200 does not perform braking force control in the deceleration enhanced mode but performs regenerative control of the drive motor 150 in the ordinary mode. Such control of the vehicle braking force is implemented by a series of deceleration drive mode change control performed by the controller 200 as described below.

Figure 3:
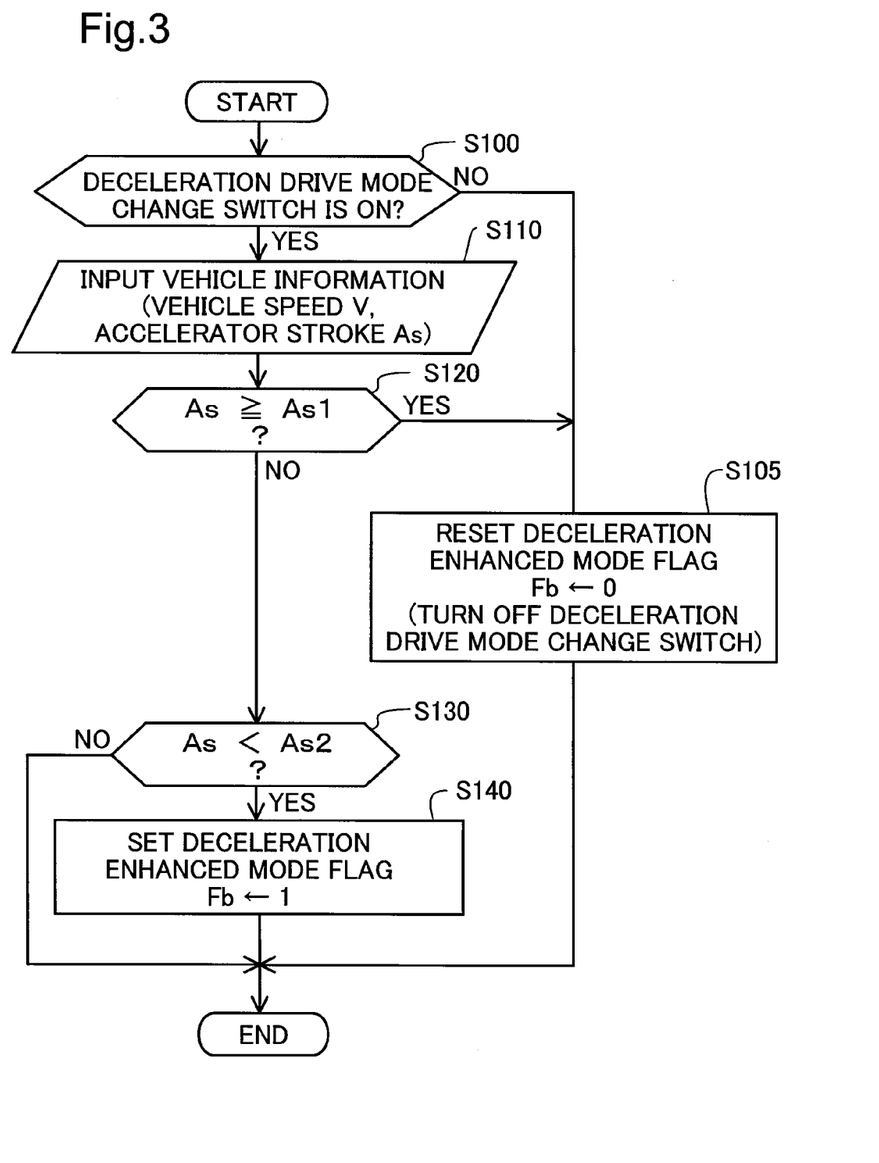
FIG. 3 is a flowchart showing a flow of mode change determination control to determine a change of the deceleration drive mode.
Figure 4:
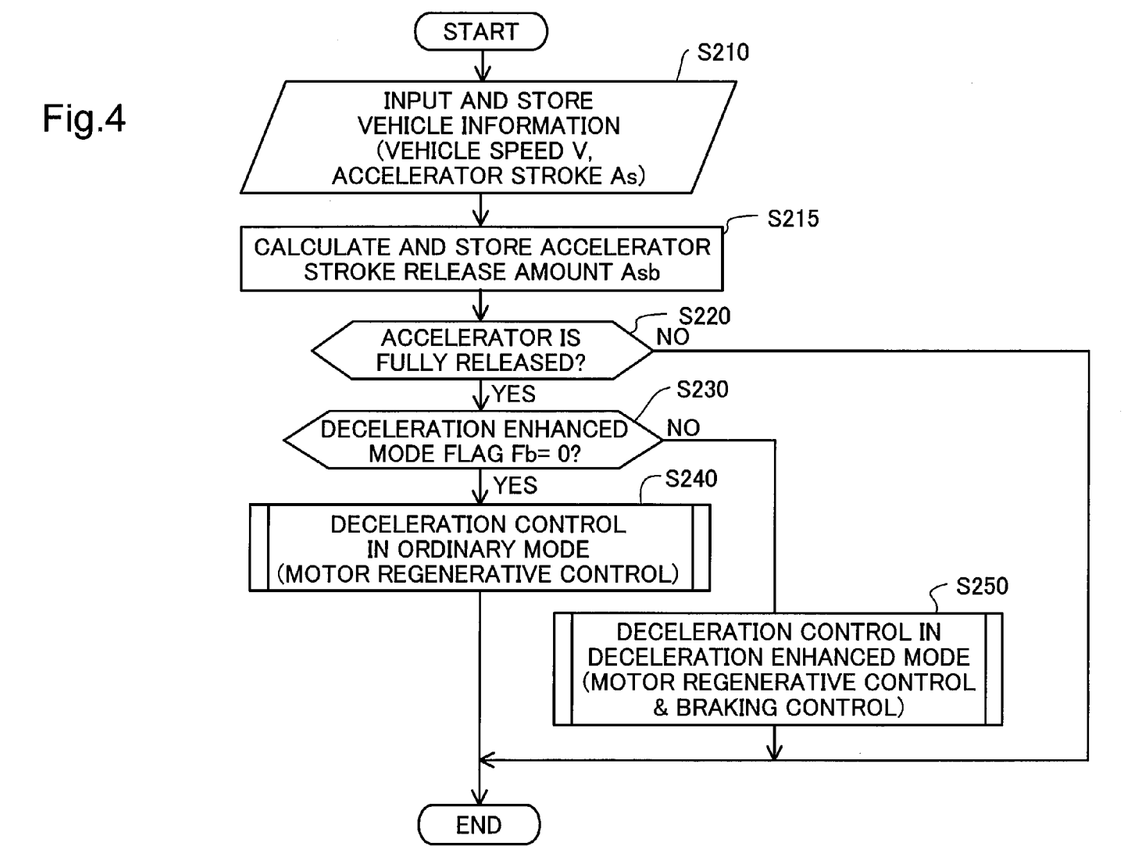
FIG. 4 is a flowchart showing a flow of deceleration control in the determined deceleration drive mode.
Figure 5:
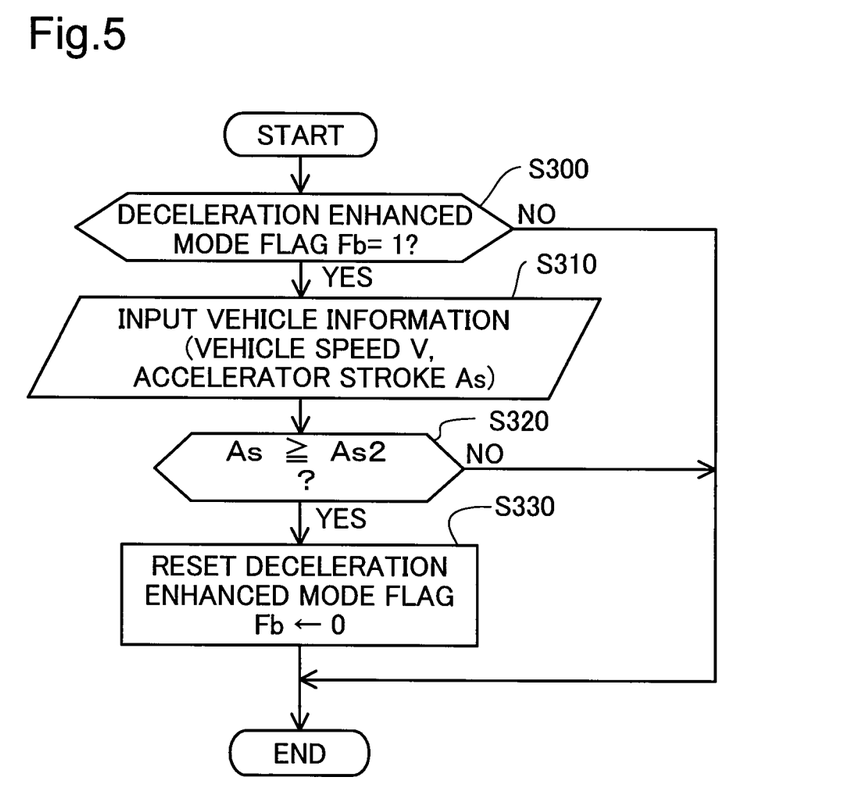
FIG. 5 is a flowchart showing a flow of mode return determination control to determine a return from a deceleration enhanced mode to an ordinary mode.

FIG. 3 is a flowchart showing a flow of mode change determination control to determine a change of the deceleration drive mode. FIG. 4 is a flowchart showing a flow of deceleration control in the determined deceleration drive mode. FIG. 5 is a flowchart showing a flow of mode return determination control to determine a return from the deceleration enhanced mode to the ordinary mode. The mode change determination control of FIG. 3, the deceleration control of FIG. 4 and the mode return determination control of FIG. 5 are repeatedly performed by the controller 200 at respective predetermined time intervals after an ON operation of an ignition switch (not shown) in the vehicle 10. When the executing timings of the respective controls are the same, the mode change determination control, the deceleration control in the accelerator-off state and the mode return determination control are performed preferentially in this sequence.

In the mode change determination control of FIG. 3, the controller 200 first determines whether the driver turns on the deceleration drive mode change switch 30 (step S100). In response to a negative answer, the controller 200 resets a deceleration enhanced mode flag Fb to value 0 (step S105). The deceleration enhanced mode flag Fb is set to value 1 in response to an ON operation of the deceleration drive mode change switch 30 by the driver who requires the deceleration enhanced mode in order to decelerate the vehicle with the higher deceleration force than the deceleration force for decelerating the vehicle in the ordinary mode. Accordingly, setting the deceleration enhanced mode flag Fb indicates the state to perform deceleration control in the deceleration enhanced mode for decelerating the vehicle with the higher deceleration force than that in the ordinary mode. Resetting the deceleration enhanced mode flag Fb indicates the state to perform deceleration control in the ordinary mode. The braking force actually applied to the driveshaft 160 and the front and rear wheels 180F and 180R depends on the stroke of the accelerator 20 and the depression amount of the brake pedal 22 prior to the control of the braking force. The deceleration control in the ordinary mode or in the deceleration enhanced mode follows the flow of deceleration control (FIG. 4) described later. Subsequent to the negative answer at step S100, the controller 200 resets the deceleration enhanced mode flag Fb to the value 0 at step S105 to prepare for the processing of and after step S110 in a subsequent cycle of this routine and deceleration control of FIG. 4 and terminates this routine. When the deceleration drive mode change switch 30 is ON, the controller 200 resets the deceleration drive mode change switch 30 to OFF, along with resetting the deceleration enhanced mode flag Fb at step S105. This will be described later in detail.

When it is determined at step S100 that the driver turns on the deceleration drive mode change switch 30, i.e., in response to an affirmative answer, the controller 200 inputs vehicle information including the vehicle speed V and the accelerator stroke As that represents the driver's depression amount of the accelerator 20 (step S110). The controller 200 subsequently compares the input accelerator stroke As with the first threshold As1 shown in FIG. 2 (step S120). When it is determined at step S120 that the input accelerator stroke As is equal to or higher than the first threshold As1, i.e., in response to an affirmative answer, the controller 200 proceeds to step S105 to reset the deceleration enhanced mode flag Fb to the value 0 and terminates this routine. In this case, the deceleration enhanced mode flag Fb is reset to the value 0 at step S105, subsequent to the affirmative answer at step S120. The accelerator stroke As is in the area A shown in FIG. 2, so that the driver's operation of the deceleration drive mode change switch 30 is not accepted or is cancelled. This indicates the state not to change the deceleration drive mode to the deceleration enhanced mode for decelerating the vehicle with the higher deceleration force than that in the ordinary mode but to decelerate the vehicle in the ordinary mode. In this case, the deceleration drive mode change switch 30 is reset to OFF as described above. As described above, despite the driver's ON operation of the deceleration drive mode change switch 30, when the accelerator stroke As is increased to the area A, the deceleration drive mode change switch 30 is reset to OFF. In this case, even when the accelerator stroke As that represents the driver's depression amount of the accelerator 20 is decreased to the area B or to the area C, the deceleration enhanced mode flag Fb is not set to the value 1. The controller 200 accordingly does not perform braking force control in the deceleration enhanced mode until the driver's subsequent ON operation of the deceleration drive mode change switch 30.

In response to a negative answer at step S120 (As<As1), on the other hand, at subsequent step S130, the controller 200 compares the accelerator stroke As input at step S110 with the second threshold As2 shown in FIG. 2. When it is determined at step S130 that the input accelerator stroke As is lower than the second threshold As2, i.e., in response to an affirmative answer, the controller 200 sets the deceleration enhanced mode flag Fb to the value 1 (step S140) and terminates this routine. In this case, the deceleration enhanced mode flag Fb is set to the value 1 at step S140, subsequent to the affirmative answer at step S130. The accelerator stroke A is in the area C shown in FIG. 2, so that the driver's operation of the deceleration drive mode change switch 30 is accepted. This indicates the state to change the deceleration drive mode from the ordinary mode to the deceleration enhanced mode for decelerating the vehicle with the higher deceleration force than that in the ordinary mode and to decelerate the vehicle in the deceleration enhanced mode.

When it is determined at step S130 that the input accelerator stroke As is equal to or higher than the second threshold As2, i.e., in response to a negative answer, on the other hand, the controller 200 terminates this routine without any further processing. The negative answer at step S130 subsequent to the negative answer at step S120 indicates that the accelerator stroke As is in the area B shown in FIG. 2. In the case of the negative answer at step S130, the deceleration enhanced mode flag Fb set or reset in a previous cycle of this routine of mode change determination control is kept unchanged. For example, in the case where the deceleration enhanced mode is activated in response to the driver's operation of the deceleration drive mode change switch 30, the activation is not cancelled but is sustained. When the accelerator stroke As is in the area B shown in FIG. 2, the deceleration enhanced mode flag Fb is reset by the mode return determination control shown in FIG. 5.

The following described the deceleration control of the vehicle 10 with reference to FIG. 4. In the deceleration control of FIG. 4, the controller 200 first inputs vehicle information including the vehicle speed V and the accelerator stroke As that represents the driver's depression amount of the accelerator 20 and stores the input accelerator stroke As in a specified storage area (step S210). According to this embodiment, the currently input accelerator stroke As and the previously input accelerator stroke As are stored in the specified storage area. The controller 200 calculates an accelerator stroke release amount Asb based on a variation of the stored accelerator stroke As and stores the newly calculated accelerator stroke release amount Asb in a specified storage area (step S215). This is for the purpose of checking the stroke of the accelerator 20.

The controller 200 subsequently determines whether the driver fully releases the accelerator 20 and does not step on the accelerator 20, based on the calculated accelerator stroke release amount Asb (step S220). When it is determined at step S220 that the driver does not fully release the accelerator 20, the controller 200 terminates this routine with no need for further deceleration control of the vehicle 10.

When it is determined at step 5220 that the driver fully releases the accelerator 20, i.e., in an affirmative answer, on the other hand, the controller 200 reads the deceleration enhanced mode flag Fb set or reset in the mode change determination control of FIG. 3 described above and determines whether the deceleration enhanced mode flag Fb is the value 0 (step S230). As described above, the deceleration enhanced mode flag Fb is set (Fb=1), when the accelerator stroke As is in the area C shown in FIG. 2 after the driver's ON operation of the deceleration drive mode change switch 30. The deceleration enhanced mode flag Fb is reset (Fb=0) when the deceleration drive mode change switch 30 is not turned on by the driver or when the accelerator stroke As is increased to the area A shown in FIG. 2 after the driver's ON operation of the deceleration drive mode change switch 30. Resetting the deceleration enhanced mode flag Fb indicates the state to perform deceleration control in the ordinary mode. In response to an affirmative answer (Fb=0) at step 5230, the controller 200 performs deceleration control in the ordinary mode (step S240). The deceleration control in the ordinary mode does not apply braking without the driver's depression of the brake pedal 22. In response to the driver's depression of the brake pedal 22, the deceleration control in the ordinary mode performs regenerative control of the drive motor 150 with rotation of the front wheels 180F based on the driver's depression amount of the brake pedal 22 and applies the regenerative braking force obtained by the regenerative control of the drive motor 150 to the driveshaft 160 to decelerate the vehicle 10. During deceleration control in the ordinary mode, the controller 200 may use the regenerative electric power obtained by the regenerative control of the drive motor 150 to charge the secondary battery 130 or as the driving power for the auxiliary machinery 135, for example, the compressor in the oxidizing gas supply system and the circulation pump in the cooling water circulation system. In the course of such consumption of regenerative electric power, the controller 200 performs braking force control in the ordinary mode at step S240 to decelerate the vehicle 10 by using the regenerative braking force of the drive motor 150 as the deceleration force. During deceleration control of the vehicle 10 in the ordinary mode, in response to the driver's depression of the brake pedal 22, the controller 200 calculates a deceleration force corresponding to the driver's depression amount of the brake pedal 22 and performs regenerative control of the drive motor 150 to obtain the calculated deceleration force.

In response to a negative answer (Fb=1) at step S230, on the other hand, the controller 200 performs deceleration control in the deceleration enhanced mode (step S250). Like engine braking in an engine vehicle, the deceleration control in the deceleration enhanced mode applies the braking force obtained by regenerative control of the drive motor 150 to the driveshaft 160 without the driver's depression of the brake pedal 22. When the driver steps on the brake pedal 22, the controller 200 activates drive control of the front wheel brakes 190F and the rear wheel brakes 190R, in addition to the braking force by the regenerative control to decelerate the vehicle 10 with the higher deceleration force than that in the ordinary mode. In the case where the high regenerative braking force is obtainable by consumption of the regenerative electric power of the drive motor 150, for example, when the secondary battery 130 has a state of charge that is substantially equal to zero and a sufficient amount of regenerative electric power is consumed to charge the secondary battery 130 or when the auxiliary machinery 135 consume a sufficient amount of regenerative electric power, the controller 200 enables the higher deceleration force than the deceleration force in the ordinary mode to be covered by the regenerative braking force of the drive motor 150. When the driver steps on the brake pedal 22, the controller 200 causes the deceleration force corresponding to the driver's depression amount of the brake pedal 22 to be covered by the mechanical braking force obtained by drive control of the front wheel brakes 190F and the rear wheel brakes 190R, in addition to the regenerative braking force of the drive motor 150, so as to decelerate the vehicle 10 with the higher deceleration force than the deceleration force in the ordinary mode. The controller 200 may cause the higher deceleration force than the deceleration force in the ordinary mode to be covered only by the mechanical braking force obtained by drive control of the front wheel brakes 190F and the rear wheel brakes 190R, so as to decelerate the vehicle 10. As in the deceleration control in the ordinary mode, in the course of decelerating the vehicle 10 in the deceleration enhanced mode, the controller 200 calculates the deceleration force corresponding to the driver's depression amount of the brake pedal 22 and performs regenerative control of the drive motor 150 in combination with drive control of the front wheel brakes 190F and the rear wheel brakes 190R, in order to obtain the higher deceleration force than the calculated deceleration force, for example, the deceleration force that is increased from the deceleration force in the ordinary mode by 10% to 20%.

The following describes the process of returning the deceleration drive mode from the deceleration enhanced mode with reference to FIG. 5. In the mode return determination control of FIG. 5, the controller 200 reads the deceleration enhanced mode flag Fb set or reset in the mode change determination control of FIG. 3 described above and determines whether the current deceleration drive mode is the deceleration enhanced mode (step S300). In response to a negative answer (Fb=0), the controller 200 determines that the current deceleration drive mode is the ordinary mode and terminates this routine without any further processing.

In response to an affirmative answer (Fb=1) at step S300, the controller 200 inputs vehicle information including the vehicle speed V and the accelerator stroke As that represents the driver's depression amount of the accelerator 20 (step S310). The controller 200 subsequently compares the input accelerator stroke As with the second threshold As2 shown in FIG. 2 (step S320). When it is determined at step S320 that the accelerator stroke As is lower than the second threshold As2, i.e., in response to a negative answer, the controller 200 terminates this routine without any further processing. In the case of the negative answer at step S320 subsequent to the affirmative answer (Fb=1) at step S300, the deceleration enhanced mode flag Fb is kept to the value 1 after the negative answer at step S320. The deceleration enhanced mode flag Fb is set to the value 1 in the mode change determination control of FIG. 3 when the accelerator stroke As is in the area C of lower than the second threshold As2 shown in FIG. 2 (steps S130 and S140). The negative answer at step S320 subsequent to the affirmative answer (Fb=1) at step S300 indicates that the accelerator stroke As is kept in the area C. This indicates continuation of deceleration control of the vehicle 10 in the deceleration enhanced mode.

Subsequent to an affirmative answer (As≥As2) at step S320, the controller 200 resets the deceleration enhanced mode flag Fb to the value 0 (step S330) and terminates this routine. As described above, the deceleration enhanced mode flag Fb is set to the value 1 in the mode change determination control of FIG. 3 when the accelerator stroke As is in the area C of lower than the second threshold As2 shown in FIG. 2 (steps S130 and S140). Accordingly, the affirmative answer at step S320 subsequent to the affirmative answer (Fb=1) at step S300 indicates that the accelerator stroke As increases from the area C to the area B. The deceleration enhanced mode flag Fb is reset to the value 0 at step S330 subsequent to the affirmative answer (As≥As2) at step S320. In this case, the accelerator stroke As based on the driver's depression of the accelerator 20 increases to or above the second threshold As2 after setting of the deceleration enhanced mode flag Fb to the value 1, so that the deceleration drive mode in the accelerator-off state is changed from the deceleration enhanced mode to the ordinary mode (step S240 in FIG. 4).

As described above, in response to the driver's operation of the deceleration drive mode change switch 30, the vehicle 10 of the embodiment selectively changes the deceleration drive mode in the accelerator-off state between the ordinary mode that uses the regenerative braking force obtained by regenerative control of the drive motor 150 as the deceleration force (step S240 in FIG. 4) and the deceleration enhanced mode that decelerates the vehicle 10 with the higher deceleration force than that in the ordinary mode (step S250 in FIG. 4) according to the accelerator stroke As. When the driver releases the accelerator 20 in the state that the accelerator stroke As is in the area C of lower than the second threshold As2, the vehicle 10 of the embodiment performs deceleration control in the deceleration enhanced mode with the higher deceleration force than that in the ordinary mode. When the accelerator stroke As increases to or above the second threshold As2 after the change of the deceleration drive mode to the deceleration enhanced mode, the vehicle 10 of the embodiment returns the deceleration drive mode from the deceleration enhanced mode to the ordinary mode (steps S320 and S330 in FIG. 5). The driver's depression of the accelerator 20 to increase the accelerator stroke As from the area C to or above the second threshold As2 is not based on the driver's intention of returning the deceleration drive mode from the deceleration enhanced mode to the ordinary mode but is based on the driver's intention of acceleration. The vehicle 10 of the embodiment does not require the driver's any specific operation such as resetting of the deceleration drive mode change switch 30 to return the deceleration drive mode from the deceleration enhanced mode to the ordinary mode. This relieves the driver's load. In the vehicle 10 of the embodiment, the increase of the accelerator stroke As to return the deceleration drive mode from the deceleration enhanced mode to the ordinary mode is attributed to the driver's depression of the accelerator 20 based on the driver's intention of acceleration. The deceleration force in the case of the driver's release of the accelerator 20 after depression of the accelerator 20 is reduced by returning the deceleration drive mode to the ordinary mode. This does not provide significant deceleration of the vehicle corresponding to engine braking in an engine vehicle, in the case of the driver's release of the accelerator 20 after significant depression of the accelerator 20 based on the driver's intention of acceleration. The vehicle 10 of this embodiment thus reduces the likelihood that the driver feels strange.

In the vehicle 10 of the embodiment, the second threshold As2 used to determine whether the deceleration drive mode is to be returned from the deceleration enhanced mode to the ordinary mode is set to the different profiles in the low speed range having the vehicle speed of not higher than 50 km/h and in the high speed range having the vehicle speed of higher than 50 km/h as shown in FIG. 2. The second threshold As2 in the low speed range is set to be higher than the value of the second threshold As2 in the high speed range and to increase with a decrease in vehicle speed. This provides the following advantages. The driver steps on the accelerator 20 for the purpose of acceleration, whether the vehicle speed is in the low speed range or in the high speed range. In the low speed range, the vehicle 10 of the embodiment does not return the deceleration drive mode from the deceleration enhanced mode to the ordinary mode but maintains the deceleration enhanced mode unless the accelerator stroke As increases to or above the second threshold As2 in response to the driver's significant depression of accelerator 20 (negative answer at step S320 in FIG. 5). The vehicle generally repeats deceleration and acceleration in a traffic jam and is likely to run in the low speed range. During a run of the vehicle 10 in the low speed range with repetition of deceleration and acceleration in a traffic jam, the vehicle 10 of this embodiment reduces the frequency of returning the deceleration drive mode from the deceleration enhanced mode to the ordinary mode. Accordingly, the vehicle 10 of this embodiment performs deceleration control with the higher deceleration force in the deceleration enhanced mode, based on the driver's repetitive demands for deceleration and acceleration.

When the driver steps on the brake pedal 22, the vehicle 10 of the embodiment uses both regenerative control of the drive motor 150 and drive control of the front wheel brakes 190F and the rear wheel brakes 190R to generate the higher deceleration force in the deceleration enhanced mode compared with the deceleration force in the ordinary mode. The vehicle 10 of this embodiment can thus readily generate the higher deceleration force in the deceleration enhanced mode than the deceleration force in the ordinary mode.

When the accelerator stroke As based on the driver's depression of the accelerator 20 is equal to or higher than the first threshold As1, the vehicle 10 of the embodiment continues deceleration control in the ordinary mode with the lower deceleration force than that in the deceleration enhanced mode, despite the driver's operation of the deceleration drive mode change switch 30 (FIG. 2 and affirmative answer at step S120 in FIG. 3). When the deceleration enhanced mode flag Fb has been set in advance to the value 1, the vehicle 10 of the embodiment automatically resets the deceleration drive mode change switch 30 to OFF, in addition to resetting the deceleration enhanced mode flag Fb to the value 0. The accelerator stroke As equal to or higher than the first threshold As1 is attributed to the driver's significant depression of the accelerator 20 based on the driver's intention of acceleration. The deceleration force in the accelerator-off state after depression of the accelerator 20 is accordingly the low deceleration force in the ordinary mode. Even when the accelerator stroke As decreases to the area C shown in FIG. 2, the vehicle 10 of the embodiment does not perform deceleration control in the deceleration enhanced mode. This does not provide significant deceleration of the vehicle in the case of the driver's release of the accelerator 20 after significant depression of the accelerator 20 based on the driver's intention of acceleration. The vehicle 10 of this embodiment thus reduces the likelihood that the driver feels strange.

The invention is not limited to the embodiment described above but may be implemented by a diversity of other aspects and configurations without departing from the scope of the invention. For example, the technical features of the embodiment corresponding to the technical features of each of the aspects described in SUMMARY may be replaced or combined appropriately, in order to solve part or all of the problems described above or in order to achieve part or all of the advantageous effects described above. Any of the technical features may be omitted appropriately unless the technical feature is described as essential herein.

The above embodiment describes the front-wheel drive vehicle configured to transmit the driving force of the drive motor 150 to the front wheels 180F. The invention is, however, not limited to the vehicle of this configuration but is also applicable to a rear wheel-drive vehicle configured to transmit the driving force of the drive motor 150 to the rear wheels 180R or to a four-wheel drive vehicle having the drive motor 150, the driveshaft 160 and the distribution gear 170 provided on both the front wheels and the rear wheels.

In the embodiment described above, the deceleration drive mode is changed from the ordinary mode to the deceleration enhanced mode in response to the driver's operation of the deceleration drive mode change switch 30. This configuration is, however, not restrictive. During a run of the vehicle on a long descending slope, the vehicle speed increases in response to the driver's slight depression of the accelerator 20 or even without the driver's depression of the accelerator 20. A modification may refer to an increasing profile of the vehicle speed and an increasing profile of the depression amount of the accelerator 20 (accelerator stroke As) to identify a run of the vehicle on a long descending slope and may change the deceleration drive mode from the ordinary mode to the deceleration enhanced mode without the driver's operation of the deceleration drive mode change switch 30. The modification may return the deceleration drive mode from the deceleration enhanced mode to the ordinary mode, based on the relationship between the accelerator stroke As and the vehicle speed V like the embodiment described above. This further relieves the driver's load. According to another modification, the accelerator 20 may be equipped with a switch configured to detect no depression of the accelerator 20. This modification may allow for omission of the steps of reading the vehicle information and calculating the accelerator stroke release amount Asb in FIG. 4.

The invention is not limited to any of the embodiments, the examples and the modifications described above but may be implemented by a diversity of other configurations without departing from the scope of the present invention. For example, the technical features of any of the embodiments, examples and modifications corresponding to the technical features of each of the aspects described in SUMMARY may be replaced or combined appropriately, in order to solve part or all of the problems described above or in order to achieve part or all of the advantageous effects described above. Any of the technical features may be omitted appropriately unless the technical feature is described as essential herein. In any of the embodiments and the modifications, part or all of the functions or the processes implemented by software may be configured by hardware. Part or all of the functions or the processes implemented by hardware may be configured by software. The hardware may be any of various circuits, such as integrated circuit, discrete circuit or circuit module as combination of these circuits.

What is claimed is:

1. A vehicle capable of regenerative braking, comprising:
    a motor that is configured to be driven with electric power;
    a mode selector switch that is configured to be manually switched to selectively set a drive mode of the vehicle in an accelerator-off state between an ordinary mode that decelerates the vehicle and a deceleration enhanced mode that decelerates the vehicle with higher deceleration force than deceleration force in the ordinary mode; and
    a controller that is configured to perform regenerative control of the motor in the ordinary mode, or perform deceleration control of generating the higher deceleration force in the deceleration enhanced mode, in order to decelerate the vehicle in the drive mode set by the mode selector switch, wherein
    when an accelerator stroke based on a driver's depression of an accelerator becomes higher than a cancellation threshold in the drive mode set to the deceleration enhanced mode, the controller changes the drive mode from the deceleration enhanced mode to the ordinary mode, and
    the cancellation threshold takes different values when a vehicle speed is in a low speed range and in a high speed range, and the cancellation threshold in the low speed range is higher than the cancellation threshold in the high speed range.

2. The vehicle according to claim 1,
    wherein the mode selector switch changes the drive mode from the ordinary mode to the deceleration enhanced mode in response to a driver's specified operation.

3. The vehicle according to claim 1,
    wherein the higher deceleration force in the deceleration enhanced mode is generated by combination of the regenerative control of the motor and control of a braking device that is configured to mechanically brake rotations of wheels.

4. The vehicle according to claim 1, further comprising a fuel cell that is configured to receive supply of a fuel gas and generate the electric power.

5. A control method of a vehicle, the vehicle being capable of regenerative braking and comprising a motor that is configured to be driven with electric power, the control method comprising
    selectively setting, using a manual switch, a drive mode of the vehicle in an accelerator-off state between an ordinary mode that decelerates the vehicle and a deceleration enhanced mode that decelerates the vehicle with higher deceleration force than deceleration force in the ordinary mode;
    performing regenerative control of the motor in the ordinary mode, or performing deceleration control of generating the higher deceleration force in the deceleration enhanced mode, in order to decelerate the vehicle in the set drive mode; and
    when an accelerator stroke based on a driver's depression of an accelerator becomes higher than a cancellation threshold in the drive mode set to the deceleration enhanced mode, changing the drive mode from the deceleration enhanced mode to the ordinary mode, wherein the cancellation threshold takes different values when a vehicle speed is in a low speed range and in a high speed range, and the cancellation threshold in the low speed range is higher than the cancellation threshold in the high speed range.

6. The control method of the vehicle according to claim 5, wherein the setting the drive mode comprises changing the drive mode from the ordinary mode to the deceleration enhanced mode in response to a driver's specified operation.

7. The control method of the vehicle according to claim 5, wherein the performing the deceleration control comprises generating the higher deceleration force in the deceleration enhanced mode by combination of the regenerative control of the motor and control of a braking device that is configured to mechanically brake rotations of wheels.

8. The control method of the vehicle according to claim 5, wherein the vehicle comprises a fuel cell that is configured to receive supply of a fuel gas and generate electric power.

* * * * *